US007406921B2

(12) United States Patent
Longo

(10) Patent No.: US 7,406,921 B2
(45) Date of Patent: Aug. 5, 2008

(54) TOOL FOR RAKING AND DISTRIBUTING GRANULAR MATERIAL

(76) Inventor: Mario Michael Longo, 156 Pond View Dr., Watertown, CT (US) 06795

( * ) Notice: Subject to any disclaimer, the term of this patent is extended or adjusted under 35 U.S.C. 154(b) by 438 days.

(21) Appl. No.: 11/124,013

(22) Filed: May 6, 2005

(65) Prior Publication Data

US 2005/0268829 A1 Dec. 8, 2005

Related U.S. Application Data

(60) Provisional application No. 60/577,411, filed on Jun. 5, 2004.

(51) Int. Cl.
*A01C 5/02* (2006.01)

(52) U.S. Cl. ........................................................ 111/95

(58) Field of Classification Search ................. 111/106, 111/107

See application file for complete search history.

(56) References Cited

U.S. PATENT DOCUMENTS 3,848,402 A * 11/1974 Agen ........................ 56/400.2
4,802,782 A 2/1989 Scalf
5,469,923 A * 11/1995 Visser ........................ 172/22
5,584,256 A 12/1996 Fleming
5,787,990 A 8/1998 Miller
5,902,276 A * 5/1999 Namey, Jr. .................. 604/218
6,066,146 A * 5/2000 Carroll et al. ............... 606/148
6,279,496 B1 8/2001 Mitchell
6,581,531 B2 * 6/2003 Sawers et al. ............... 111/106
6,637,355 B2 10/2003 Springs
7,117,954 B2 * 10/2006 Vipond ....................... 172/378

* cited by examiner

*Primary Examiner*—Christopher J. Novosad
(74) *Attorney, Agent, or Firm*—Michael A. Blake

(57) ABSTRACT

The disclosed apparatus relates to a gardening tool comprising: a hollow shaft; a container in communication with the hollow shaft; a rake head located at a first end of the hollow shaft; an actuator located at a second end of the hollow shaft; a plunger located in an interior of the hollow shaft, and in communication with the actuator; an opening located on the rake head, the opening in communication with the interior of the hollow shaft; and wherein the plunger is configured move between a first position, where the plunger blocks granules within the container from entering the interior of the hollow shaft, and a second position, where the plunger allows granules within the container to enter the interior of the hollow shaft.

10 Claims, 5 Drawing Sheets

10 26 22 30 24 34 14 18 22 34 30 42 26 54 24 38 14 50 34 22 10 30 26 54 24 42 58 38 62 50

TOOL FOR RAKING AND DISTRIBUTING GRANULAR MATERIAL

CROSS-REFERENCES

The present application claims the benefit of provisional patent application Ser. No. 60/577,411, filed on Jun. 5, 2004 by Mario Michael Longo.

TECHNICAL FIELD

This invention relates generally to tools for the placement of fertilizer and plant food in soil, and more particularly to a manually operated hand tool to deposit a discrete quantity of granular material in a raked soil, mulch or other plant growing medium.

BACKGROUND

It has become popular in ornamental horticulture to place discrete quantities of fertilizer in the earth for use by individual plants as opposed to general, somewhat homogeneous application of fertilizer over broad areas as is common in field horticulture for the propagation of botanical materials that usually are of the same type and occupy larger areas. In the recent past in placing such fertilizer it has become popular to use a consolidated fertilizer mass that has been formed into the shape of a stake with a pointed end that may be driven into the earth at the place desired for fertilizer application to thereafter disperse its fertilizer components into the surrounding soil. Such fertilizer stakes are simple and easy of use, but they are somewhat difficult to form so that they maintain their configuration to withstand physical forces placed upon them prior to and during placement and yet provide an appropriate release of the fertilizer materials from which they are formed or which they carry. Fertilizer stakes also are relatively expensive, often costing several times the amount of a similar quantity of dry, granular fertilizer containing the same amount of botanical nutrient material.

Various hand tools for placement at a particular location of various materials in and beneath the soil, especially seeds, other propagative plant material and fertilizer, have heretofore become known. To be practically useful, such tools must be easily insertable into the earth and this generally requires that a lower portion of the device that first contacts the earth be of a sharp or pointed nature to aid entry and moving soil out of the path of the tool as it moves therethrough. Various prior art devices have not provided a well defined, sharp lower portion.

The force required for tool insertion into soil often is greater than can be reasonably accomplished by manual means. Prior tools have provided various foot supports, usually of a fixed nature, to allow a user's foot to aid insertion of the tool into soil.

Prior art tools have provided pivotally openable bottom doors, but during placement in the earth of such prior tools it has been common that the door may be moved laterally and askew of its pivotal axis by reason of non-symmetrical forces caused on the door, as by irregularities in the earth at the place of insertion or the type of manipulation of the tool by a user. If this occurs, the door mounting structure may be damaged and ultimately rendered inoperative or broken.

It is desirable in a tool for the placement of granular fertilizer that predetermined amounts of fertilizer may be placed and that these predetermined amounts may be varied. Prior tools have often not provided means for measurement of material to be placed or those that have allowed such measurement often have not allowed variation of the measurement.

Accordingly, there is a need for a gardening tool that overcomes these and other disadvantageous.

SUMMARY

The disclosed apparatus relates to a gardening tool comprising: a hollow shaft; a container in communication with the hollow shaft; a rake head located at a first end of the hollow shaft; an actuator located at a second end of the hollow shaft; a plunger located in an interior of the hollow shaft, and in communication with the actuator; an opening located on the rake head, the opening in communication with the interior of the hollow shaft; and wherein the plunger is configured move between a first position, where the plunger blocks granules within the container from entering the interior of the hollow shaft, and a second position, where the plunger allows granules within the container to enter the interior of the hollow shaft.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION

Figure 1:
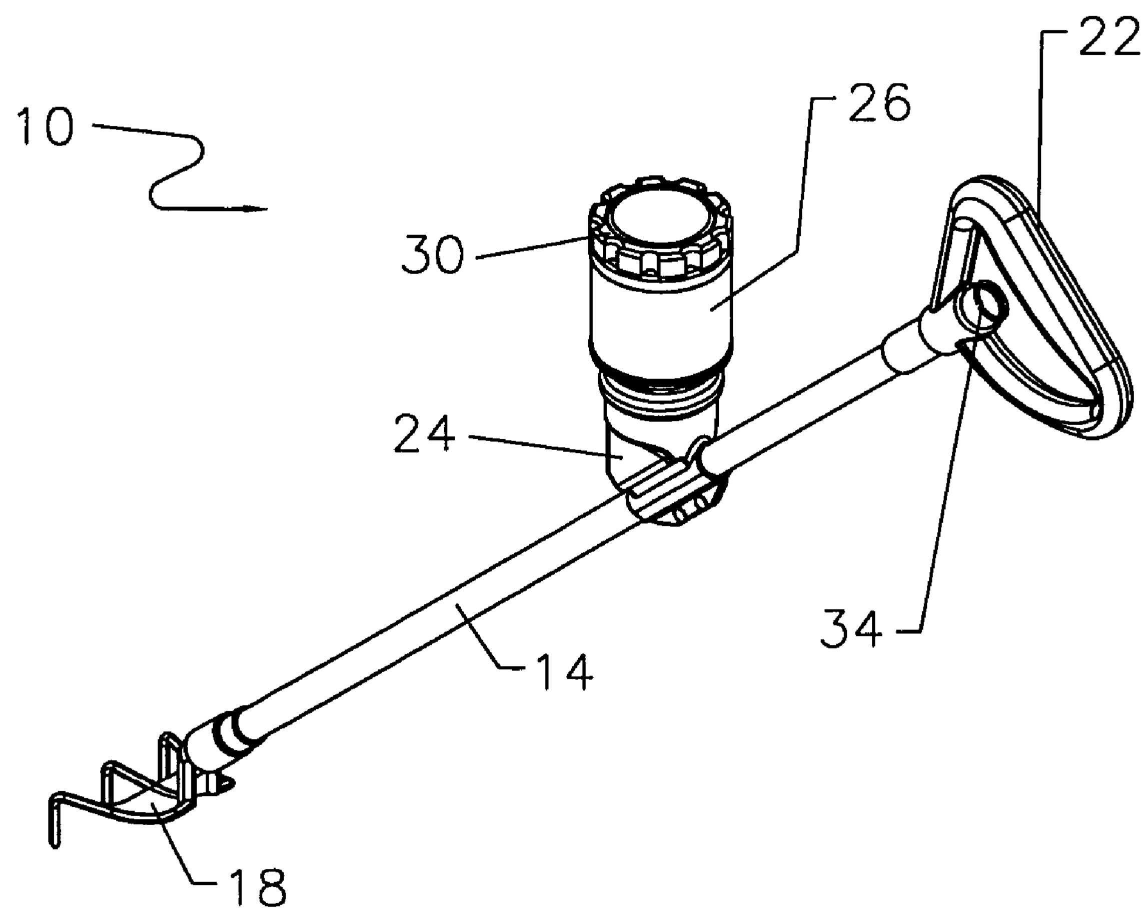
FIG. 1 is perspective view of the disclosed tool.

FIG. 1 is a perspective view of the disclosed tool 10. The tool 10 comprises a hollow shaft 14 in communication with a rake head 18 and a handle 22. Also in communication with the hollow shaft 14 is a container receptacle 24. The container receptacle 24 is in communication with a container 26. The container 26 is to hold fertilizer or plant food. The container 26 may have a lid 30 that is easy to remove, to allow a user to add or remove fertilizer or plant food from the container 26. In another embodiment, a container of fertilizer or plant food may be bought wherein the container has a threaded top. The container receptacle 24 may be configured to couple to the threads located on the bought container. An actuator 34 is in communication with the hollow shaft 14 near the handle 22. The actuator 34 may be a ring type trigger as shown in FIG. 1, or any other mechanical device such as, but not limited to a lever type trigger or button. In another embodiment, the actuator 34 may be an electro-mechanical device.

Figure 2:
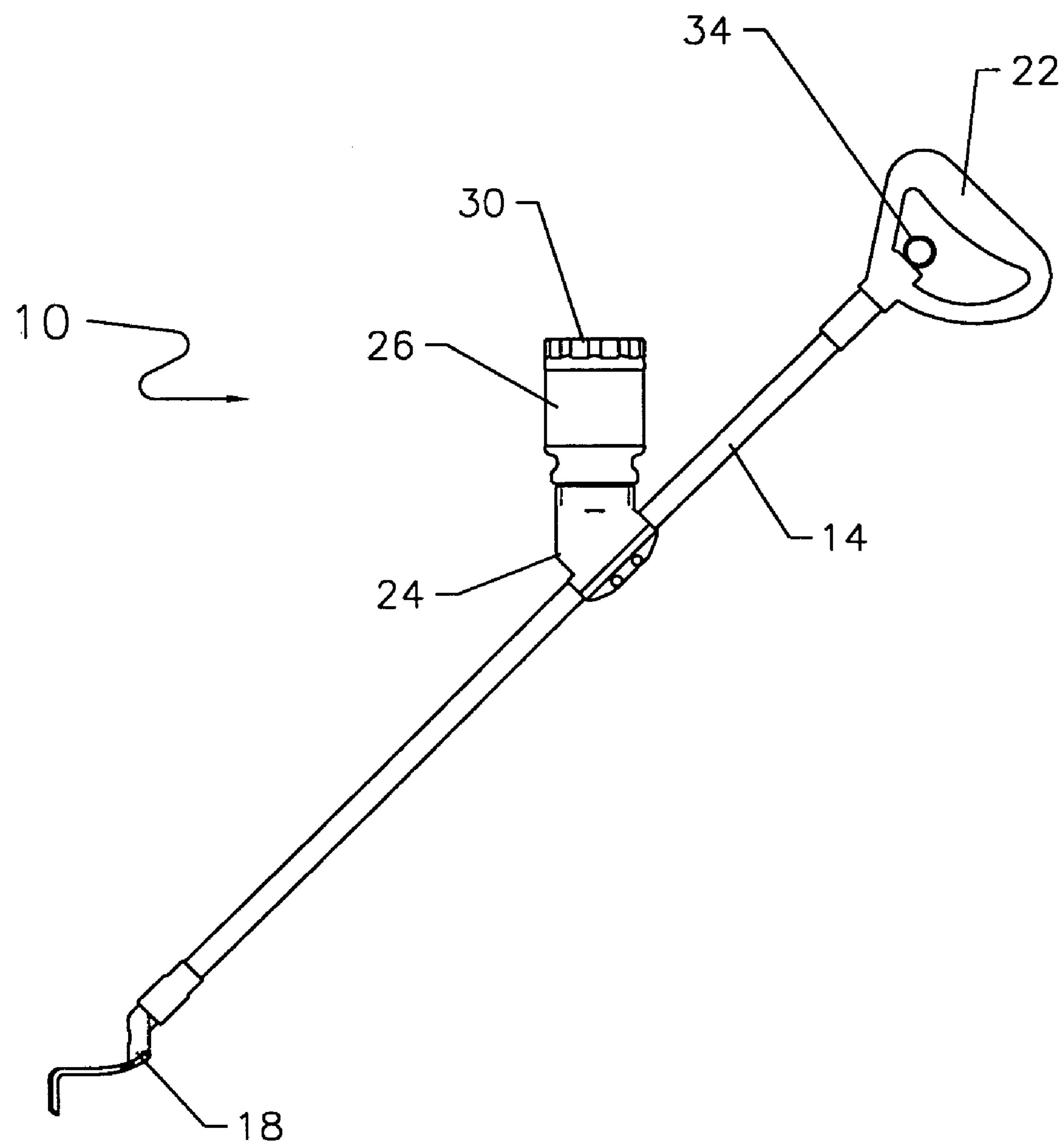
FIG. 2, is a side view of the disclosed tool.

FIG. 2 shows a side view of the tool 10.

Figure 3:
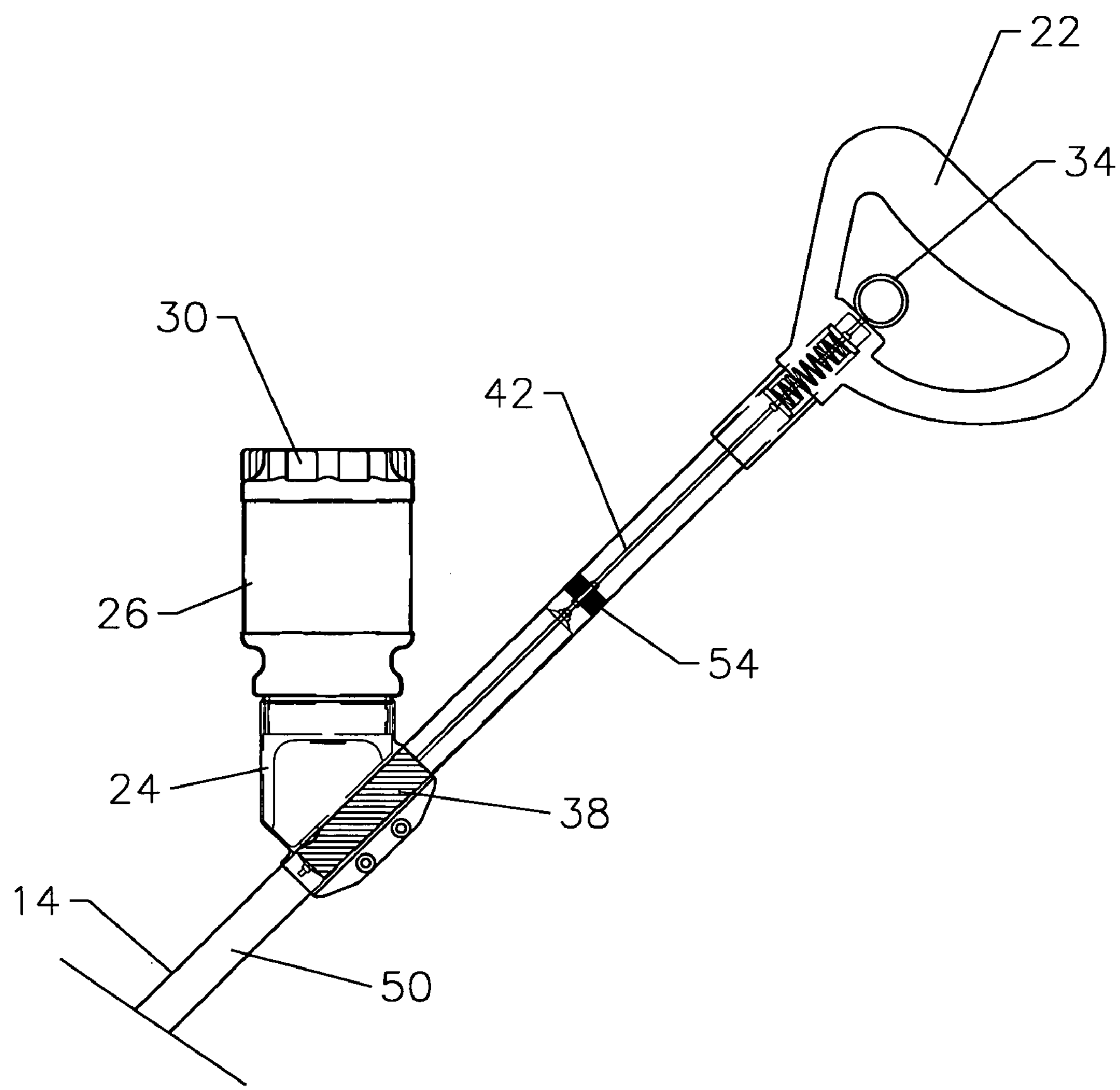
FIG. 3 is a cross-sectional view of the disclosed tool in its first state.

FIG. 3 shows a close-up cross-sectional view of the tool 10. A plunger 38 is located in the hollow shaft 14 adjacent to the container receptacle 24. The plunger 38 is in communication with a plunger rod 42. The plunger rod is also in communication with the actuator 34. The tool 10 is shown in a first state with the plunger 38 in a first position and the actuator in a first position. The actuator is in communication with a spring 46. The spring may be any of a number of types of springs, including but not limited to: leaf springs, tension springs or torsion springs. The spring 46 is configured to allow a user to actuate the actuator 34, and the spring 34 will move the actuator 34 back to its first position. In this first position, any granules in the container 26 are unable to get into the interior 50 of the hollow shaft 14. The tool 10 may have one or more plunger rod guides 54.

Figure 4:
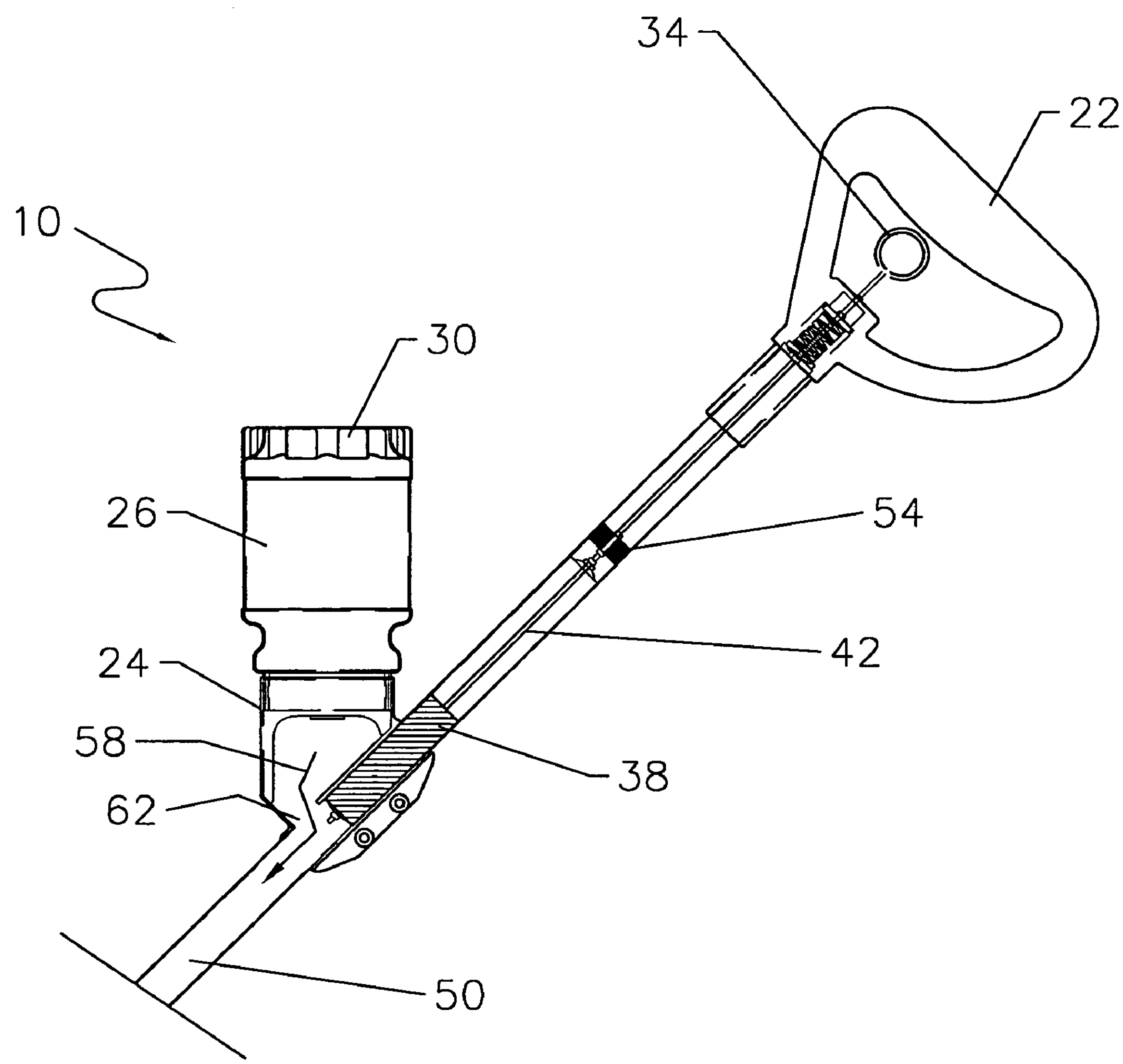
FIG. 4 is a cross-sectional view of the disclosed tool in its second state.

FIG. 4 shows the tool of FIG. 3 in a second state, where the actuator 34 has been engaged and moved to its second position, thereby moving the plunger rod 42 and plunger 38 towards the handle end of the hollow shaft 14, thus putting the plunger in its second position. In this position, any granules in the container 26 can now travel from the container 26 into the interior 50 through an opening 62 between the receptacle 24 and the hollow shaft 14. The granules may generally follow the path shown by the arrow 58. The outer surface of the plunger 38 that engages with the interior 50 of the hollow shaft 14 should be a compressible or spongy-like material. Such a material on the surface of the plunger 38 provides for a better seal to hold the granules in the container 26. Additionally, the compressibility of the material will prevent granules from getting stuck between the plunger 38 and the hollow shaft 14, thus preventing malfunctions in the tool 10. Such materials for the plunger 38 may be selected from the following non-limiting group: paint roller material, terry cloth, sponge, rubber, plastic, memory alloy, Styrofoam, and any suitably compressible material.

Figure 5:
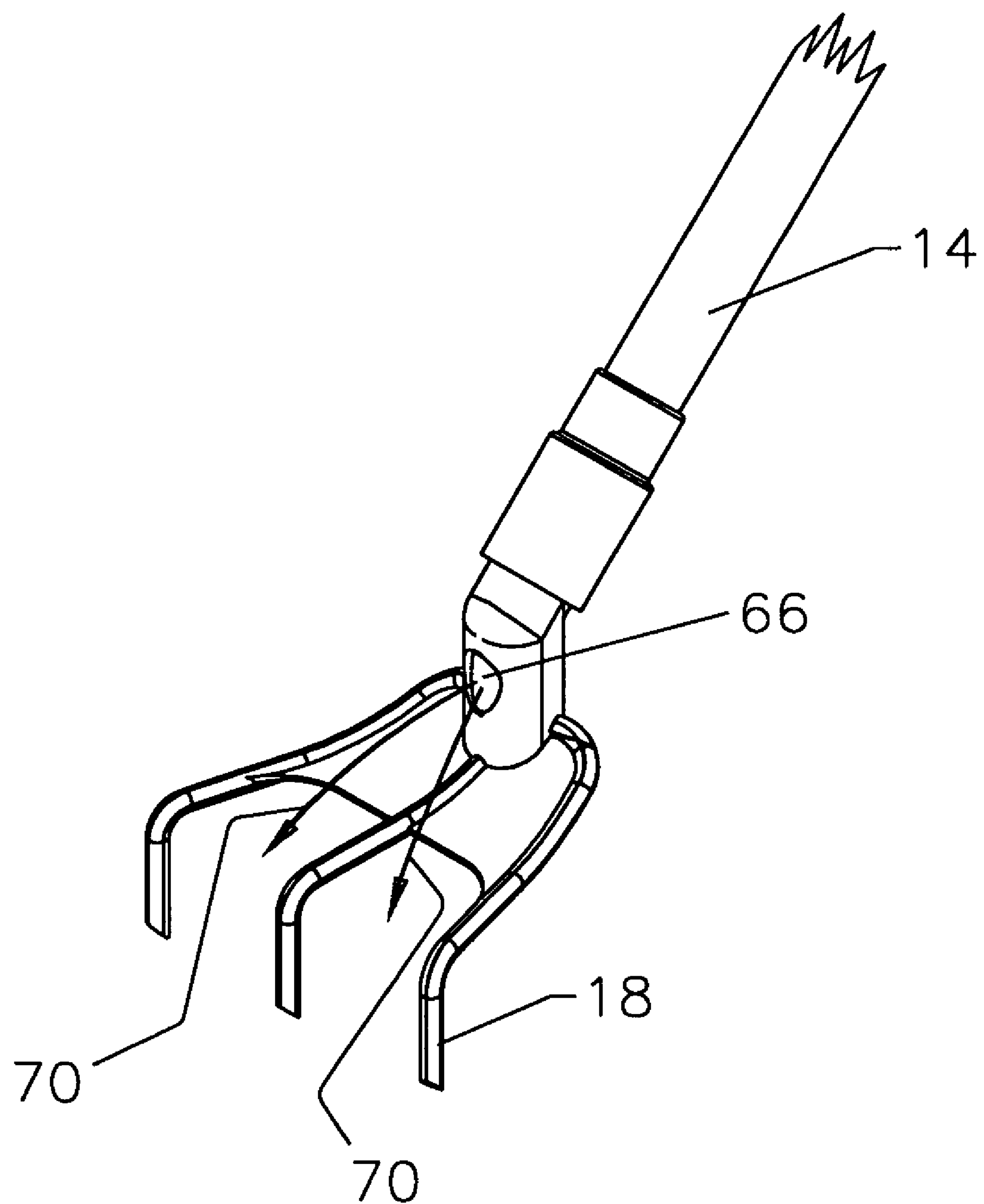
FIG. 5 is a front view of the disclosed rake head.

When in the second state, the granules will flow down the hollow shaft 14 to the rake head 18. FIG. 5 shows a perspective view of the rake head 18. An opening 66 allows the granules traveling down the interior 50 of the hollow shaft 18 to exit the hollow shaft 18. The granules will travel out of the opening 66 and fall generally between the prongs of the rake head 18 following generally the path shown by the arrows 70. FIGS. 1 and 5 show the rounded shape of the rake head 18. This allows a user to rake back towards a plant, and get very close to the plant, while raking and releasing granules. A limited amount of granules may be released by using a relatively quick actuation of the actuator 34 and releasing the actuator 34. More granules may be released by extending the length of time the actuator 34 is actuated.

The tool 10 can be used to simultaneously scratch at the ground with the rake head 18 and discharge granules from the container 26 through the rake head opening 66. Alternatively, the tool 10 can be used in a sequential manner, where the ground is scratched with the rake head 18, then the granules are discharged from the opening 66, then the ground can be scratched again, then the granules discharged again. In still another alternative, the tool 10 can be used just for raking with the rake head 18. And lastly, the tool 10 can be used just for discharging granules via the rake head opening 66.

The tool shaft 14, container 26, and container receptacle 24 may be made out of a variety of materials, including, but not limited to: metal, wood, plastic, composites, and fiberglass.

The rake head 18 may be made out of a variety of material, including but not limited to metal, wood, plastic, fiberglass, and composites. Additionally, the rake head 18 may have only 1 prong, 2 prongs, or 4 or more prongs.

The disclosed tool 10 has very few moving parts compared to other known devices, and will therefore be less expensive to manufacturer, while still very easy to use. The tool 10 allows for an intuitive use of the raking feature and granule distribution feature. The tool allows for a user to stand up while raking and distributing plant food and/or fertilizer. The shape of the rake head 18, allows a user to get very close to a plant in order to distribute plant food or fertilizer.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A gardening tool comprising:

a hollow shaft;

a container in communication with the hollow shaft;

a rake head located at a first end of the hollow shaft;

an actuator located at a second end of the hollow shaft;

a plunger located in an interior of the hollow shaft, and in communication with the actuator;

an opening located on the rake head, the opening in communication with the interior of the hollow shaft; and wherein the plunger is configured move between a first position, where the plunger blocks granules within the container from entering the interior of the hollow shaft, and a second position, where the plunger allows granules within the container to enter the interior of the hollow shaft.

2. The gardening tool of claim 1, wherein the actuator is a ring trigger.

3. The gardening tool of claim 1, where the actuator is a lever trigger.

4. The gardening tool of claim 1, wherein the actuator is in communication with a spring configured to generally keep the actuator in a first position.

5. The gardening tool of claim 1, wherein the rake head is curved with three prongs.

6. The gardening tool of claim 1, further comprising a container receptacle that couples the hollow shaft to the container.

7. The gardening tool of claim 6, wherein the container receptacle is configured to removeably couple to a store bought granule container.

8. The gardening tool of claim 1, wherein the plunger is coupled to the actuator via a plunger rod.

9. The gardening tool of claim 8, further comprising a plunger rod guide in communication with the plunger rod.

10. The gardening tool of claim 1, wherein the exterior surface of the plunger is selected from the group consisting of synthetic fibers attached to a backing, natural fibers attached to a backing, terry cloth, sponge, rubber, plastic, memory alloy, and extruded polystyrene.

* * * * *